United States Patent
Kayashima et al.

[11] Patent Number: 5,919,258
[45] Date of Patent: Jul. 6, 1999

[54] SECURITY SYSTEM AND METHOD FOR COMPUTERS CONNECTED TO NETWORK

[75] Inventors: Makoto Kayashima, Yamato; Masato Terada, Sagamihara, both of Japan

[73] Assignee: Hitachi, Ltd., Tokyo, Japan

[21] Appl. No.: 08/796,566

[22] Filed: Feb. 6, 1997

[30] Foreign Application Priority Data

Feb. 8, 1996 [JP] Japan .................................. 8-022780

[51] Int. Cl.$^6$ .................................................. G06F 11/30
[52] U.S. Cl. .............................. 713/201; 714/38; 714/47; 714/57
[58] Field of Search .............................. 395/187.01, 186, 395/200.59, 183.14, 184.01, 185.1, 185.01

[56] References Cited

U.S. PATENT DOCUMENTS

| | | | |
|---|---|---|---|
| 5,278,901 | 1/1994 | Shieh et al. | 380/4 |
| 5,414,833 | 5/1995 | Hershey et al. | 395/187.01 |
| 5,421,006 | 5/1995 | Jablon et al. | 395/183.14 |
| 5,440,723 | 8/1995 | Arnold et al. | 395/181 |
| 5,594,726 | 1/1997 | Thompson et al. | 370/485 |
| 5,621,889 | 4/1997 | Lermuzeaux et al. | 395/186 |

*Primary Examiner*—Robert W. Beausoliel, Jr.
*Assistant Examiner*—Scott T. Baderman
*Attorney, Agent, or Firm*—Antonelli, Terry, Stout & Kraus, LLP

[57] ABSTRACT

A security system for a network connected with a plurality of computers is disclosed, in which one of the computers monitors the internal status thereof. An internal status monitor unit of the one computer detects the occurrence of a fault and the type of the fault in the one computer. An access control unit of the one computer controls the access to the resources of the one computer. An information transmission unit of the one computer transmits a message to other computers of the network indicating the occurrence of a fault and the type of the fault in the one computer through the network in the case where the internal status monitor unit detects the occurrence of the fault in the one computer. The access control unit executes the processing for protecting the resources of the one computer in accordance with the type of the fault of the one computer in the case where the internal status monitor unit detects the fault of the one computer.

31 Claims, 12 Drawing Sheets

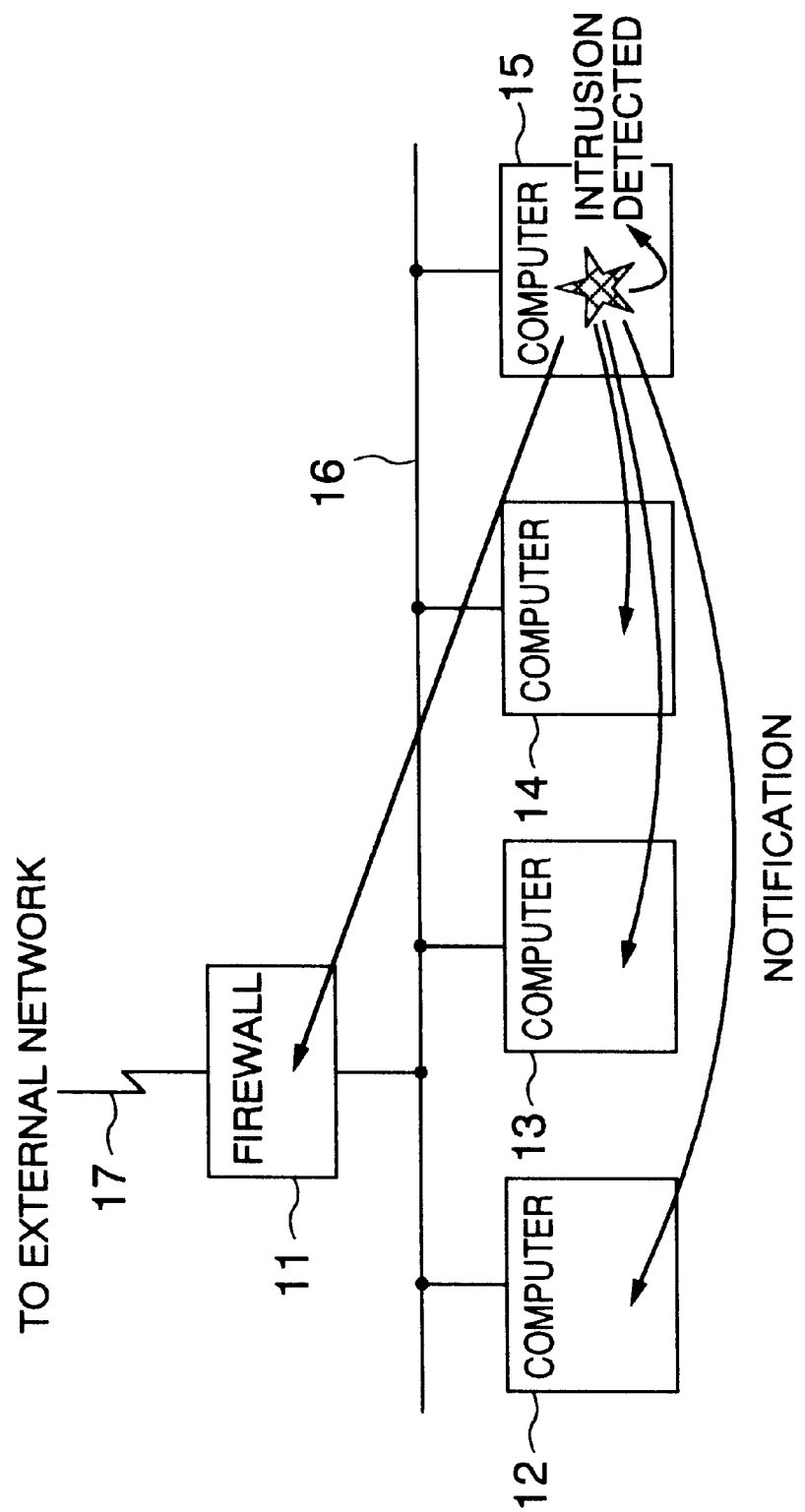

FIG.12

| DESTINATION ADDRESS | COM-MUNICATION START TIME | INPUT PACKET | OUTPUT PACKET |
|---|---|---|---|
| | | | |
| | | | |
| | | | |

| FILE ID | | 2121 |
|---|---|---|
| USER ID | | 2122 |
| PROCESS ID | | 2123 |

212

SECURITY SYSTEM AND METHOD FOR COMPUTERS CONNECTED TO NETWORK

BACKGROUND OF THE INVENTION

The present invention relates to a security system and a method for computers connected to a network, or in particular to a security system and a method wherein a computer connected to a network normalizes its own operating condition, or more in particular to a security system and a method wherein the computer executes its own protective measure against any intrusion into the network from outside.

A firewall has conventionally been suggested for limiting access from outside a network in order to provide protection against intrusion into the computer on the network from outside. The firewall controls the access to a computer on a network according to the combination of the IP address of a source and the IP address of a destination. The mainstream of the firewall has the functions of (1) limiting the IP address capable of accessing the resources of a computer for each service of TCP (transmission control protocol) or UDP (user datagram protocol), and (2) taking the access record. In particular, Firewall-1 of Checkpoint provides not only the gateways but each computer with the function of access control, and can manage the setting of a plurality of computers with a single computer.

SUMMARY OF THE INVENTION

With the development of the internet, it has become possible for the local computer of the user to acquire in real time the information transmitted from any point in the world. On the other side of the coin, however, the local computer of the user is exposed to an increased threat of external intrusion. As a protective measure against such an intrusion, a gateway (a firewall in the narrow sense of the word) has been suggested having the functions of (1) limiting the IP address which can access the resources for each service, and (2) taking the access record. The use of the firewall in the narrow sense of the work can define the range in which the manager monitors. Each computer, however, checks against an external intrusion more optimistically. Should an intruder successfully intrude through the firewall, therefore, the surrounding computers are liable to be attacked with the intruded computer as a foothold. In addition to the function of a firewall, the above-mentioned Firewall-1 of Checkpoint has the features that (1) the IP address capable of accessing the resources for each service is limited for each computer, and that (2) the address limitation is set remotely and therefore the setting of the limitation work can be performed with a single computer. The access control, however, is set statically and is not changed dynamically in accordance with an external intent. Once the computer is intruded, therefore, the manager is required to take a protective measure for the firewall and each computer.

Accordingly, an object of the present invention is to provide a security system and a method for a computer connected to a network which can obviate the above-mentioned problems of the prior art.

Another object of the invention is to provide a security system and a method in which a computer connected to a network takes its own measure for protecting the resources thereof and normalizes its own operating condition in the case where a fault of the internal condition occurs in the computer.

Still another object of the invention is to provide a security system and a method in which a computer connected to an internal network takes its own protective measure for enhancing the security against intrusion from an external network.

According to one aspect of the invention, there is provided a security system of a network having at least one computer connected thereto, including an internal status monitor unit for monitoring the internal status of the computer and detecting the occurrence and the type of a fault in the computer, and an access control unit for controlling the access to the resources of the computer, wherein the access control unit executes the processing for protecting the resources of the computer in accordance with the type of a fault of the computer in the case where the internal state monitor unit detects that the fault has occurred in the computer.

According to a second aspect of the invention, there is provided a security system and a method, wherein a computer includes an information transmission unit for transmitting a message indicating the occurrence of a fault and the type of the fault in the computer to other computers in the case where the internal status monitor unit detects that the fault has occurred in the one computer, and the other computers include an information transmission unit for receiving the message sent from the computer.

According to a third aspect of the invention, there is provided a security system and a method, wherein a computer includes an information transmission unit for receiving a message transmitted through the network from other computers and indicating the occurrence of a fault and the type of the fault in any one of the other computers, and an access control unit for protecting the resources of the one computer in accordance with the type of the fault of any one of the other computers upon receipt of the message indicating the fault received from such one of the other computers.

According to a fourth aspect of the invention, there is provided a security system and a method, wherein the internal status of a computer on an internal network connected to an external network is monitored, and upon detection of an intrusion from the external network, the computer resources are protected by access control while at the same time notifying other computers of the internal network of the contents of the detection.

According to a fifth aspect of the invention, there is provided a security system and a method, wherein a computer connected to the internal network is preferably ready for receiving a notification from any one of the other computers in the internal network, and upon receipt of a notification of intrusion by the external network from any one of the other computers, takes the processing for protecting its own resources by controlling the access thereto.

According to a sixth aspect of the invention, there is provided a security system and a method, wherein a computer connected to a network monitors the internal status thereof and is ready for receiving a notification from any one of the surrounding computers, and upon detection of an intrusion from outside of the network, communicates with the surrounding computers on the network to take a joint protective measure against the intrusion.

According to a seventh aspect of the invention, there is provided a security system and a method, wherein a computer monitors at least one of the number of execution processes, the traffic of the network interface and the access to an important file, and determines that a fault has occurred in the case where the result of the monitoring deviates from a predetermined limitation.

According to an eighth aspect of the invention, there is provided a security system and a method, wherein the access to the computer is controlled stepwise in accordance with the contents of the fault detection by the monitor unit thereby to protect the computer resources.

According to a ninth aspect of the invention, there is provided a security system and a method, wherein the data obtained by monitoring is compared with the data on the internal status of the computer registered in a table in advance, thereby making it possible to determine an external intrusion as a fault. The contents of the table can be determined by the user.

According to a tenth aspect of the invention, there is provided a security system and a method, wherein a computer notifies the other computers of the contents of the table at the time of updating the contents of the same table, and the other computers update the contents of their own tables on the basis of the notification.

According to an eleventh aspect of the invention, there is provided a security system and a method, wherein a computer connected to a network takes a protective measure against an intrusion into a network having a plurality of servers jointly operating to provide a cooperative service, and the operation of the cooperative service can be changed in accordance with the protective measure taken against the intrusion.

In a network security system according to the present invention, each computer in an organization is capable of executing its own processing for detecting an intrusion, protecting the computer resources and notifying the surrounding computers of the intrusion upon detection thereof, so that the security against the external intrusion is reinforced and the manager is notified of the intrusion at an early time.

BRIEF DESCRIPTION OF THE DRAWINGS

FIG. 1 is a block diagram showing an example of a general configuration of a security system according to the present invention.

FIG. 12 is a diagram showing an example configuration of the traffic record table of the computer shown in FIGS. 2A and 2B.

FIG. 13 is a diagram showing an example configuration of the access file information recording area of the computer shown in FIGS. 2A and 2B.

DESCRIPTION OF THE PREFERRED EMBODIMENTS

Figure 2A:
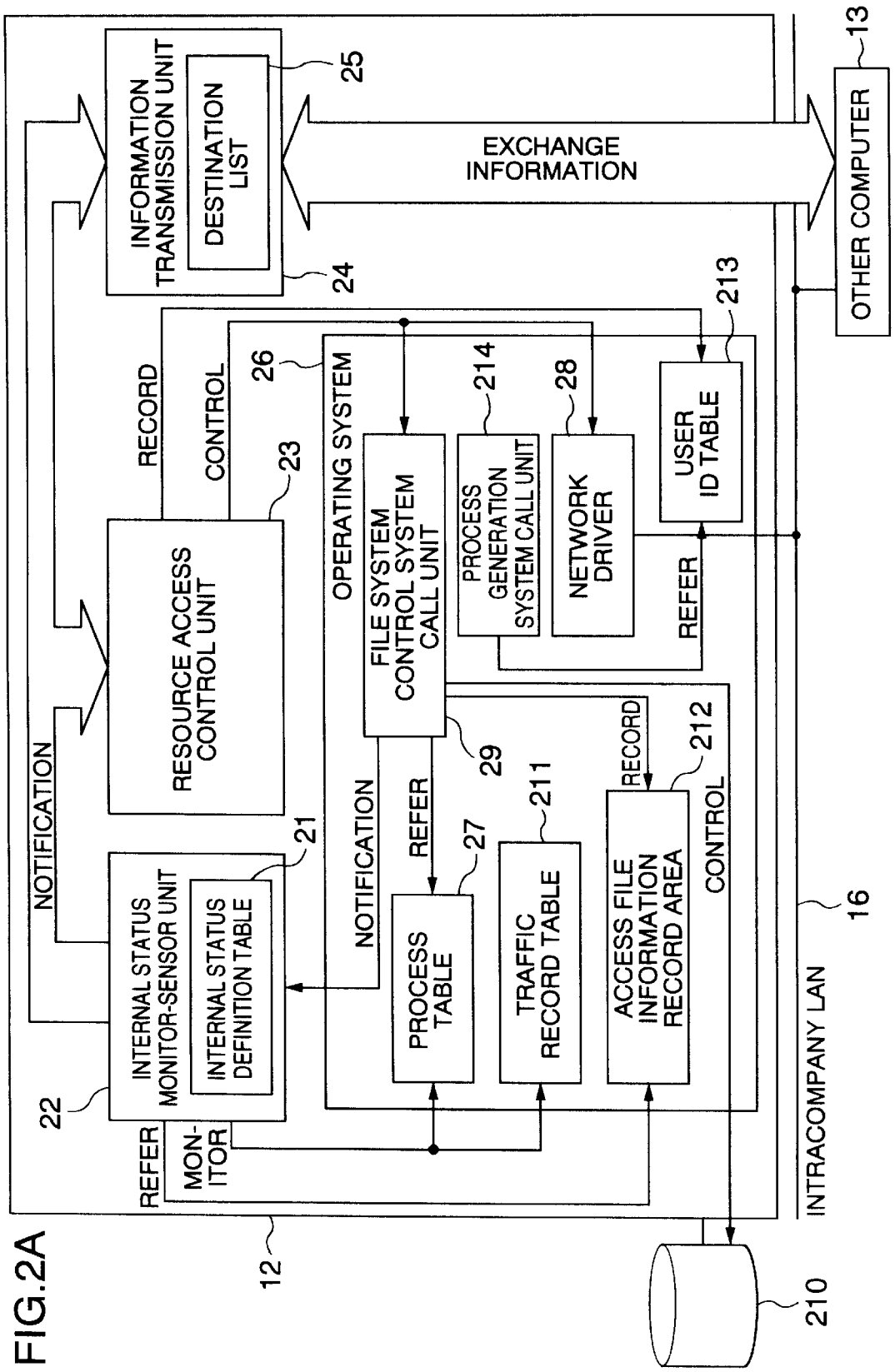
FIG. 2A is a block diagram showing an example configuration of a computer used for the security system shown in FIG. 1.

An embodiment of the invention will be described with reference to FIGS. 1 to 13. FIG. 1 is a diagram showing a general configuration of a network security system to which the invention is applicable. Numeral 11 designates a computer providing a firewall, numerals 12 to 15 computers connected to an intracompany LAN 16 constituting an internal network, and numeral 17 an exclusive line for connecting the firewall 11 and an external network. In the case where one of the computers 11 to 15, for example, the computer 15 detects an illegitimate intrusion from an external source, the local computer 15 executes the processing for limiting the access of such an illegitimate intrusion as described later, and notifies the other computers 11, 12 to 14 connected to the intracompany LAN 16 of the illegitimate intrusion. The other computers that have received this notification also perform the access control limiting processing.

FIG. 2A is a block diagram showing an example configuration of the computers 12 to 15 used for the security system shown in FIG. 1. The example configuration of the computer 12 will be explained as a representative case. The configuration of the other computers 13 to 15 is identical to that shown in FIG. 2A.

In FIG. 2A, the computer 12, which is shown connected only to the computer 13, is also similarly connected to the other computers 14, 15 and the firewall 11.

Numeral 21 designates an internal information definition table, numeral 22 an internal status monitor-sensor unit, numeral 23 a resource access control unit, numeral 24 an information transmission unit, numeral 25 a destination list, numeral 26 an operating system, numeral 27 a process table, numeral 28 a network driver, numeral 29 a file system control system call unit, numeral 210 an external storage unit, numeral 211 a traffic record table, numeral 212 an access file information record area, numeral 213 a user ID table, and numeral 214 a process generation system call unit.

In this embodiment, the resources of a computer are assumed to include the OS process of the computer and a file for the external storage unit 210.

The destination list 25 is assumed to describe the other computers 11, 13 to 15 in the network as destinations of communication from the computer 12.

The internal status monitor-sensor unit 22 monitors the status of the operating system 26, compares the result of monitoring with the contents of the internal status definition table 21, and thereby detects a fault of the internal status of the local computer and the intrusion from a source external to the network. Upon detection of a fault by the internal status monitor-sensor unit 22, the fault detection is notified from the internet status monitor-sensor unit 22 to a resource access control unit 23 and an information transmission unit 24. Then, the resource access control unit 23 causes the operating system 26 to execute the processing for controlling the access to the local computer. The information transmission unit 24, on the other hand, executes the processing for notifying the other computers 11, 13 to 15 described in the destination list 25 of the fault detection through the intracompany LAN 16. Upon receipt of a notification of the detection of a fault by the computer 12 from one of the other computers 11, 13 to 15, say, the computer 13, the information transmission unit 24 assures whether the source computer 13 is registered in the destination list 25, and then notifies the resource access control unit 23 that a fault is notified to the computer 13. The resource access control unit 23 causes the operating system 26 to execute the processing for controlling the access and to control the job in execution. In the case of UNIX system, for example, controlling a job in execution is equivalent to terminating the process in execution or changing the priority of the process at the discretion of the manager. Specifically, the user process executing a job posing an extremely heavy burden on the computer is terminated, or the priority of such a job is downgraded, thereby making it possible to continue the execution of other services.

The network driver 28 is connected to the intracompany LAN 16 and transmits and receives data to and from each computer on the intracompany LAN 16.

Figure 2B:
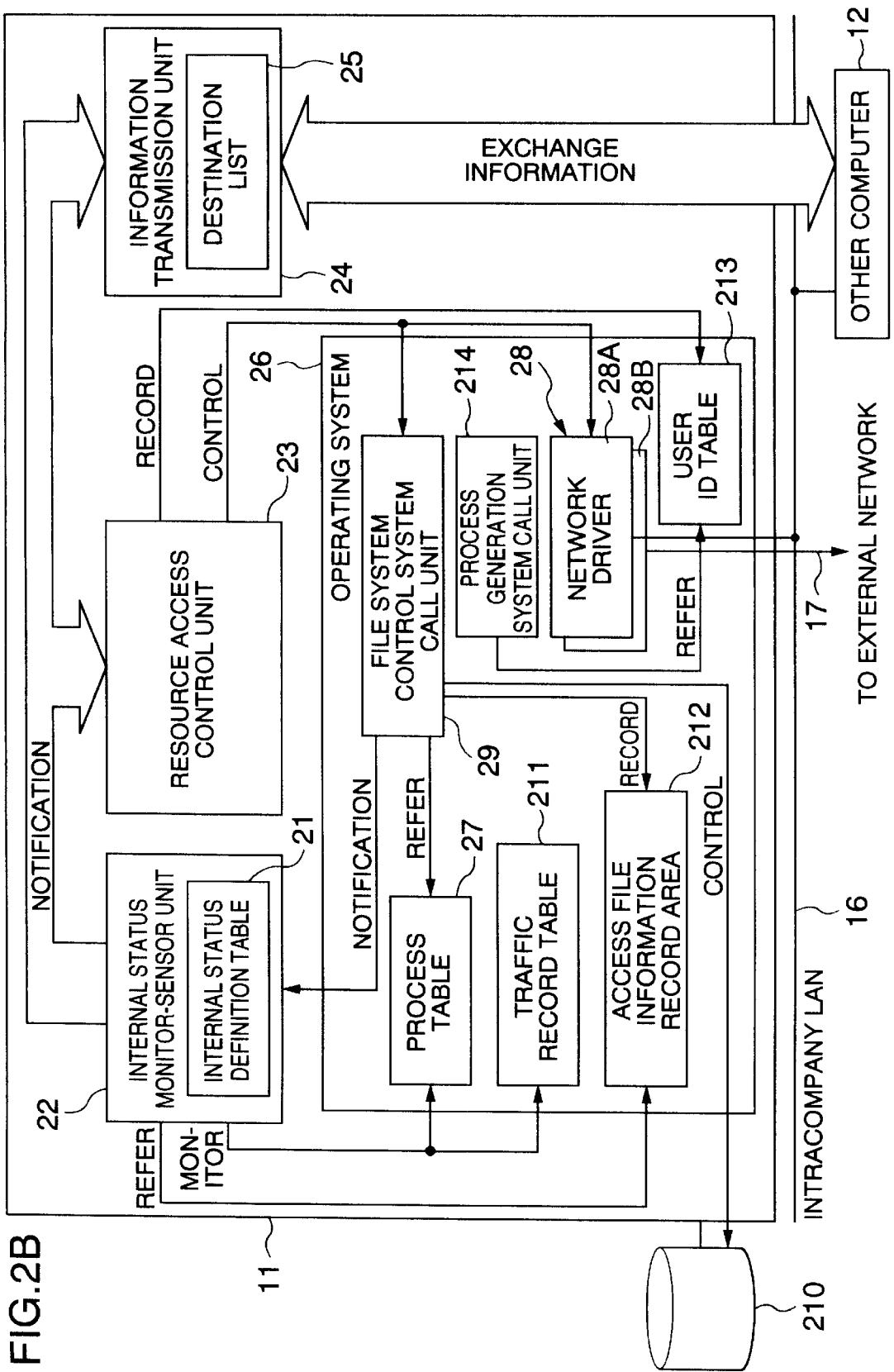
FIG. 2B is a block diagram showing an example configuration of a firewall used for the security system shown in FIG. 1.

FIG. 2B is a block diagram showing an example configuration of the firewall 11 used for the security system shown in FIG. 1. The firewall 11 has a configuration similar to the computers 12 to 15 shown in FIG. 2A, except that the firewall 11 is connected to an exclusive line 17 and further includes a network driver 28B for transmitting and receiving data to and from an external network, in addition to the network driver 28A connected to the intracompany LAN 16.

Now, the configuration of the table and the transmission message used for the computers 11 to 15 will be explained with reference to FIGS. 8, 9 and 11.

Figure 8:
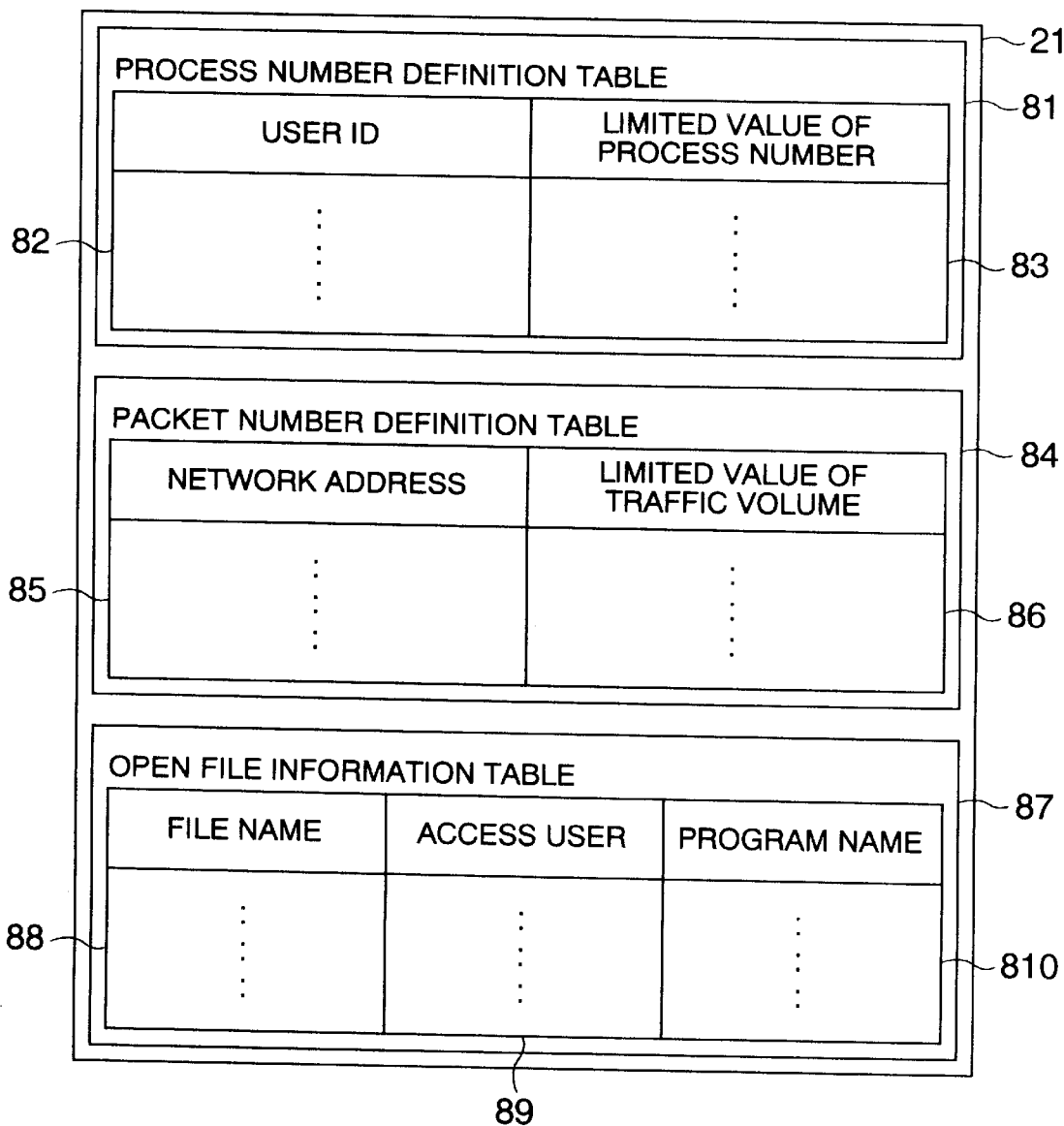
FIG. 8 is a diagram showing an example configuration of an internal status definition table of the computer shown in FIGS. 2A and 2B.

FIG. 8 is a diagram showing an example structure of the internal status definition table 21 of the computers 11 to 15. The internal status definition table 21 of the computer 12 will be explained as a representative case. In FIG. 8, numeral 81 designates a process number definition table, which is a mass of records including a user ID field 82 describing the user ID of the computer 12 and a process number limit value field 83 describing the limited value of the process number in execution for each user. Numeral 84 designates a packet number definition table which is a mass of records including a network address field 85 describing the networks communicable with the computer 12 and/or the addresses of hosts (computers) (addresses of the destinations) and/or a traffic limited value field 86 describing the limited value of traffic volume (the limited value of the received packet number per unit of time) for each network and/or each host (destination). Numeral 87 designates an open file information table which is a mass of records including a file name field 88 describing the file names stored in the external storage unit 210 of the computer 12, an access user field 89 describing the ID of users accessible to files for each file, and a program name field 810 describing the names of the programs used by the access user for accessing the file. The internal status definition tables of the computers 11, 13 to 15 also have the same configuration. The manner in which the internal status definition table 21 is set can be determined by the user freely and independently for each of the computers 11, 13 to 15.

In executing the service against the access from an external network, (1) more than an expected number of predetermined processes may be initiated by a given user, (2) more than an expected number of predetermined packets may be received from a given network or a given host, or (3) a specific file may be accessed by an unexpected user or by a user with an unexpected program. The items in the contents of the table shown in FIG. 8 are checked and the intrusion from an external source to the computer is detected by detecting a fault of the computer.

Figure 9:
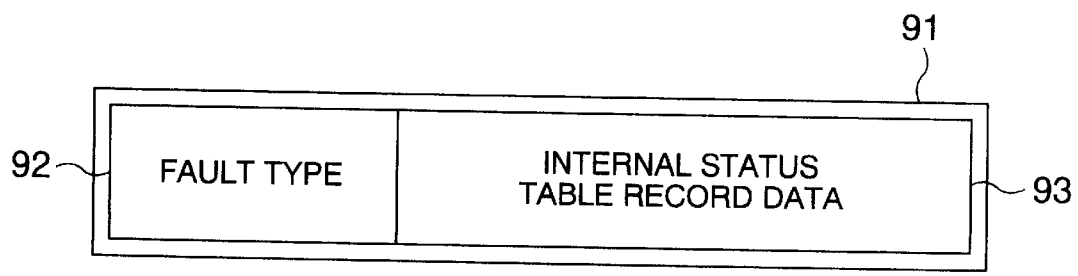
FIG. 9 is a diagram showing an example configuration of a message transmitted between each processing section of a computer or between computers.

FIG. 9 is a diagram showing an example configuration of a message transmitted to the resource access control unit 23 and the information transmission unit 24 of the local computer and the other computers upon detection of a fault of the status of the local computer. In this example, the message 91 includes a field 92 for storing the type of fault and a field 93 for storing the internal status table record data. The field 92 has stored therein "the process number definition table monitoring result" indicating that the number of processes initiated in (1) above is abnormal, i.e., is more than a predetermined value, "the network interface monitoring result" indicating that the number of the received packets in (2) above is abnormal, i.e., more than a predetermined value, or "the open file monitoring result" indicating that the specific file in (3) above is accessed by an unexpected user and/or the same file is accessed with an unexpected program. The internal status table record data stored in the field 93 are the record corresponding to the process number definition table 81, the packet number definition table 84 or the open file information table 87.

More specifically, in the case where the process number being executed by a given one of the users registered in the table 81 is abnormal, the field 93 stores the user ID associated with the fault determination and the limited value of the process number of the particular user ID as a single record. In the case where the number of packets received per unit of time from a given one of the networks or the hosts registered in the table 84 is abnormal, on the other hand, the field 93 stores the address of the network or the host associated with the fault determination and the limited value of the traffic volume per unit of time of the particular network or the local host as a single record. Also, in the case where a given one of the files registered in the table 87 is accessed by an unexpected user and/or in the case where the particular file is accessed with an unexpected program, then the field 93 stores the file name of the particular file, the user ID accessible to the particular file and the name of the program used in accessing the local file as a single record.

In the case where the number of processes being executed by a given one of the users registered in the table 81 is abnormal, the field 93 may store only the user ID associated with the fault determination as a single record. Also, in the case where the number of packets received per unit of time from a given one of the networks or hosts registered in the table 84 is abnormal, the field 93 may store only the address of the particular network or host associated with the fault determination as a single record. Further, in the case where a given one of the files registered in the table 87 is accessed by an unexpected user, the field 93 may store only the name of the particular file as a single record. In similar fashion, in the case where a given file is accessed with an unexpected program (by an expected or unexpected user), the field 93 may store only the name of the particular program as a single record.

The open file information table 87 may include only the field 88 for storing the file names and the field 89 for storing the names of access users, so that whether an access to the file is legitimate or not is determined by determining whether the file is accessed by an unexpected user or not. Alternatively, the open file information table 87 may include only the field 88 for storing the file names and the field 90 for storing the program names, so that whether an access to the file is legitimate or not is determined by determining whether the file is accessed with an unexpected program or not.

Figure 11:
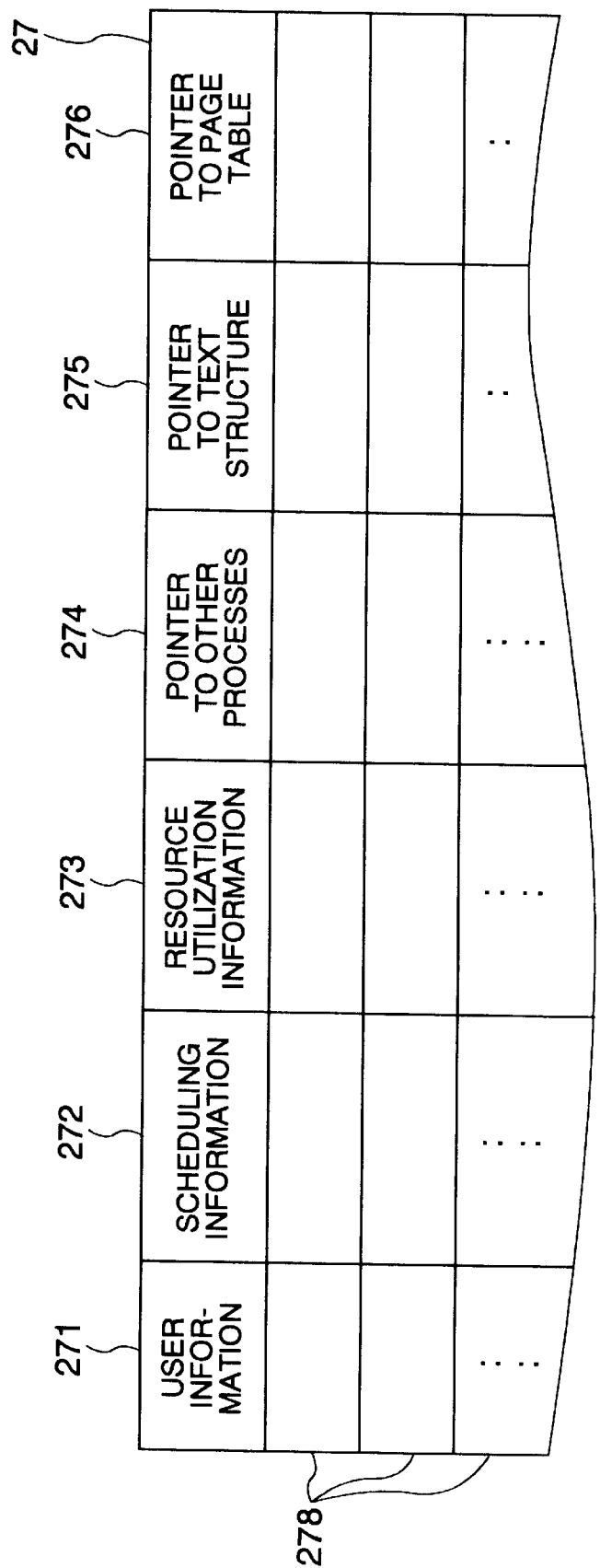
FIG. 11 is a diagram showing an example configuration of the process table of the computer shown in FIGS. 2A and 2B.

FIG. 11 shows an example configuration of the process table 27 for the computers 11 to 15. This table is resident in the kernel of the operating system 26 and holds the information on one process as a single record. The table 27 contains the fields of user information 271, scheduling information 272, resource utilization information 273, a pointer 27 to other processes, a pointer 275 to a text structure and a pointer 27 to a page table. The user information 271 indicates whether each entry 278 is in use or not, and in the case where a given entry is in use, indicates the executor (user ID) of the process corresponding to the entry. The scheduling information 272 indicates whether the process corresponding to the entry is "generated", "in execution", "waiting" or "executable". The information 273 concerning the resource utilization indicates to each input or output device of the local computer whether the process associated with an entry is "in use", "waiting" or "miscellaneous". The pointer 274 to other processes is a pointer pointing to other processes (parent process, etc.) required for executing a process. The pointer 275 to a text structure is for indicating the text area that can be shared with other processes. The pointer 276 to the page table is for indicating an entry of a table holding the correspondence between a virtual address and a real address. According to the invention, the entry number (number of entries 278) of the process table 27 and the user information 271 of each entry are taken advantage of for grasping the number of processes in use for each user. The user is determined from the user ID in the user information 271. The number of processes requiring access to a specific device can be determined, for example, by utilizing the information 273 concerning the resource utilization.

FIG. 12 shows an example configuration of the traffic record table 211 of the computer shown in FIGS. 2A, 2B. The traffic record table 211 is resident in the kernel of the operating system 26 and stores various information about a single source or a single destination (network and host) as a single record. The table 211 includes a field 2111 for storing the address of the source or destination, i.e., the other party of communication (destination address), a field 2112 for storing the time starting communication with the other party, a field 2113 for storing the number of packets input (received) from the other party, and a field 2114 for storing the number of packets output (transmitted) to the other party. The communication start time written in the field 2112 is the time when the operation of the local computer is started (switched on) or the time when the first packet is input from the corresponding other party. The communication start time, therefore, is reset each time the computer operation is started. The total number of packets input from the other corresponding party from the communication start time of the field 2112 is written in the input packet number field 2114. The output packet number field 2114, on the other hand, has written therein the total number of packets output to the other corresponding other party from the communication start time of the field 2112.

The network driver 28 searches the table 211 when sending data to or receiving them from other networks or a computer (host), and checks whether the table 211 already contains the entry (address) of the particular network or computer (host). In the case where the table 211 already contains the address of the other party and data are transmitted to or received from the particular other party, then the number of packets transmitted or received, as the case may be, is added to the number of packets stored in the corresponding field 2114 or 2113, respectively. In the absence of the entry (address of the other party) of the computer providing the other party, in contrast, a new record is assigned to the other party computer, and in the case where data are transmitted to or received from the particular other party, the number of packets transmitted or received, as the case may be, is written in the corresponding field 2114 or 2113, respectively.

FIG. 13 shows an example configuration of the access file information record area 212. Numeral 2121 designates a field for recording the ID of the file to be accessed, numeral 2122 a field for recording the ID of the user executing the file access, and numeral 2123 a field for recording the ID of the process executing the file access.

Figure 3:
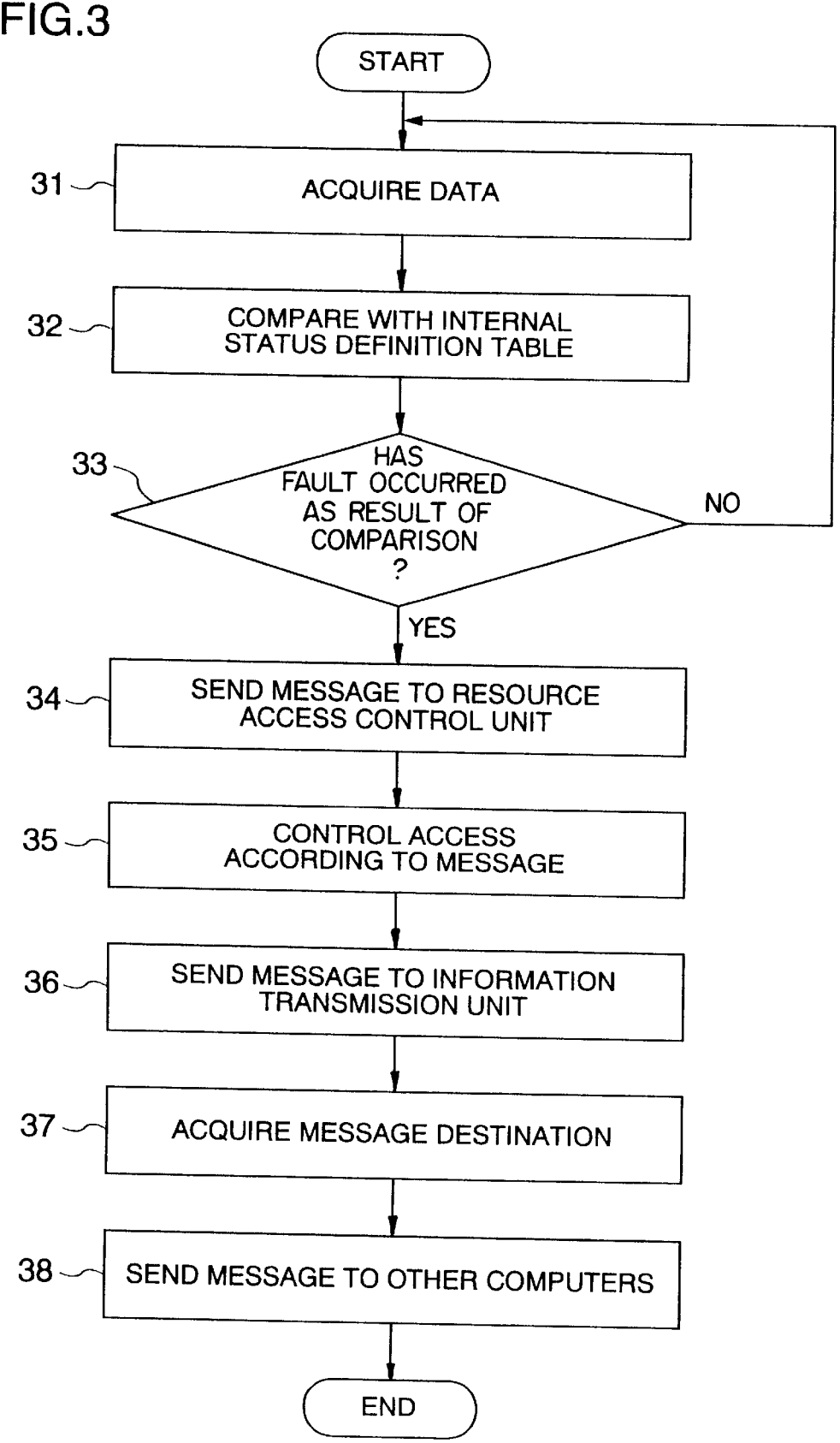
FIG. 3 is a flowchart for the processing taken when a fault is found by the internal status monitor-sensor unit in the computer shown in FIGS. 2A and 2B.

FIG. 3 is a flowchart showing the processing executed at the time of and after a fault detection by monitoring the internal status of the local computer, such as, the computer 12. First, an internal status monitor-sensor unit 22 acquires the monitor data with reference to the process table 27 and the like of the operating system 26 (step 31). Then, the monitor data thus acquired are compared with each entry of the internal status definition table 21 (step 32). Step 33 determines whether a fault has occurred in the internal status of the local computer as a result of comparison in step 32. Upon determination of the absence of a fault, the process returns to step 31. Upon determination of a fault, on the other hand, the internal status monitor sensor unit 22 sends a message (FIG. 9) notifying a fault to the resource access control unit 23 (step 34). On the basis of the result of notification in step 34, the resource access control unit 23 executes the access control processing (step 35). The internal status monitor sensor unit 22 sends a message (FIG. 9) notifying a fault to the information transmission unit 24 (step 36). Upon receipt of this notification, the information transmission unit 24 specifies the other computers 11, 13 to 15 to which the message notifying a fault is destined with reference to the destination list 25 (step 37). The information transmission unit 24 then sends a message (FIG. 9) notifying a fault to the other computers 13 to 15 and the firewall 11 (step 38). After that, the process returns to step 31 for acquiring data and repeats the above-mentioned processing (steps 31 to 38).

Figure 4:
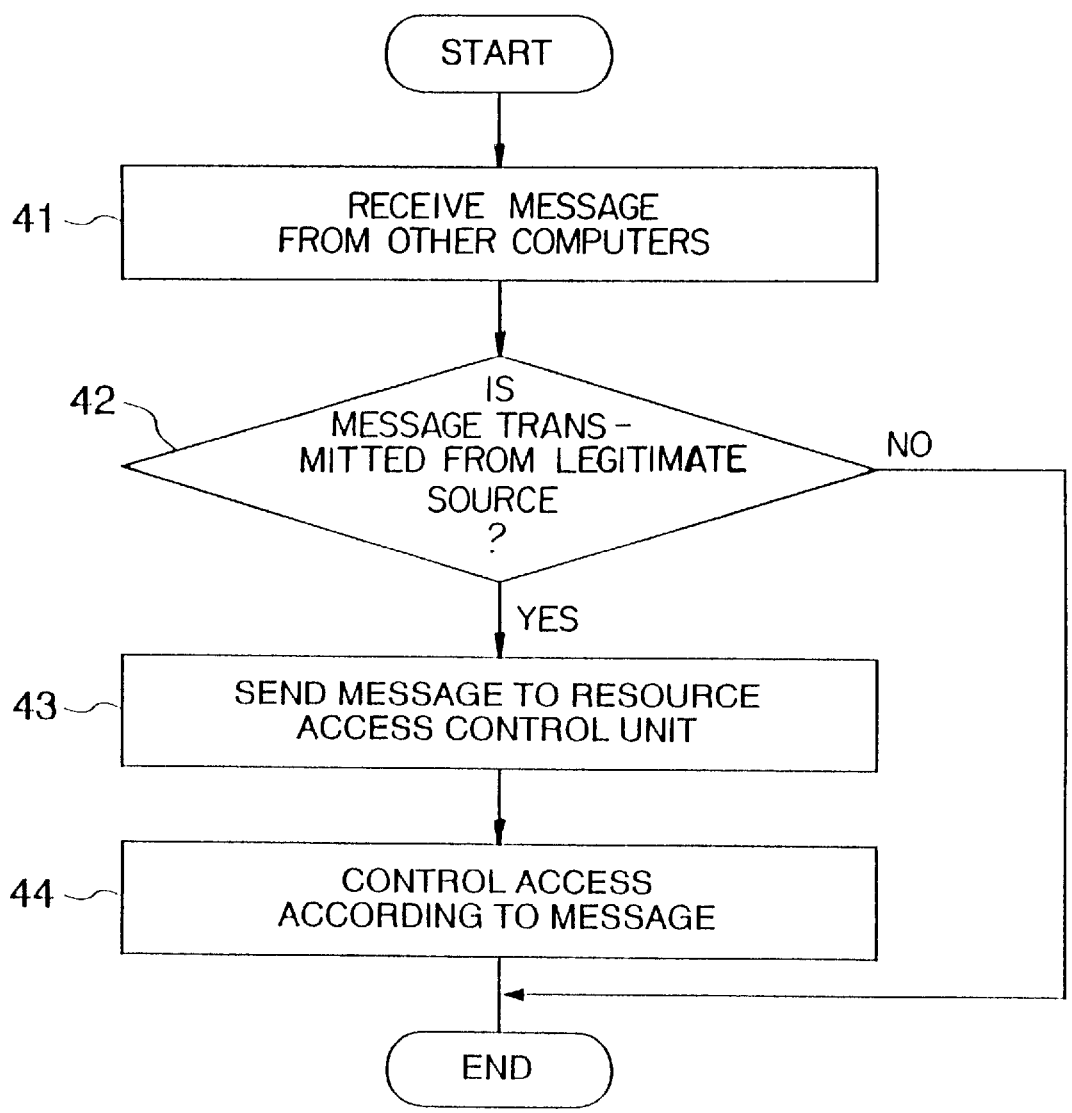
FIG. 4 is a flowchart for the processing taken when a message notifying a fault is received in the computer shown in FIGS. 2A and 2B.

FIG. 4 is a flowchart showing the processing executed upon receipt of a fault notification sent in response to the fault detection by one of the other computers. First, the information transmission unit 24 receives a fault message from the other computers (step 41). The information transmission unit 24 checks whether the message received is legitimate, i.e., whether it is transmitted from a reliable source (step 42).

Whether the received message is sent from a legitimate source (sender) or not is determined from whether the source of the message, i.e., the source (user ID, etc.) shown in the internal status table record data 93 (FIG. 9) of the message is registered in the destination list 25. In other words, in the case where the source of the message is registered in the destination list 25, the message is determined as a legitimate one sent from a legitimate source, and vice versa. Instead of reading the message source by reference to the internal status table record data 93 of the message, an electronic signature indicating the source may be written in the message using the cryptographic technique and decrypted to determine whether the message source is legitimate.

In the case where it is determined that the message source is illegitimate, the process is terminated without proceeding to subsequent steps. In the case where the message source is determined legitimate, on the other hand, the information transmission unit 24 notifies a fault of the other computers to the resource access control unit 23 (step 43). On the basis of the result of this notification, the resource access control unit 23 executes the access control processing and controls the job in execution (step 44). In the case where this processing is executed by the firewall 11, the access control processing for the computers 12 to 15 can be executed collectively.

Figure 5:
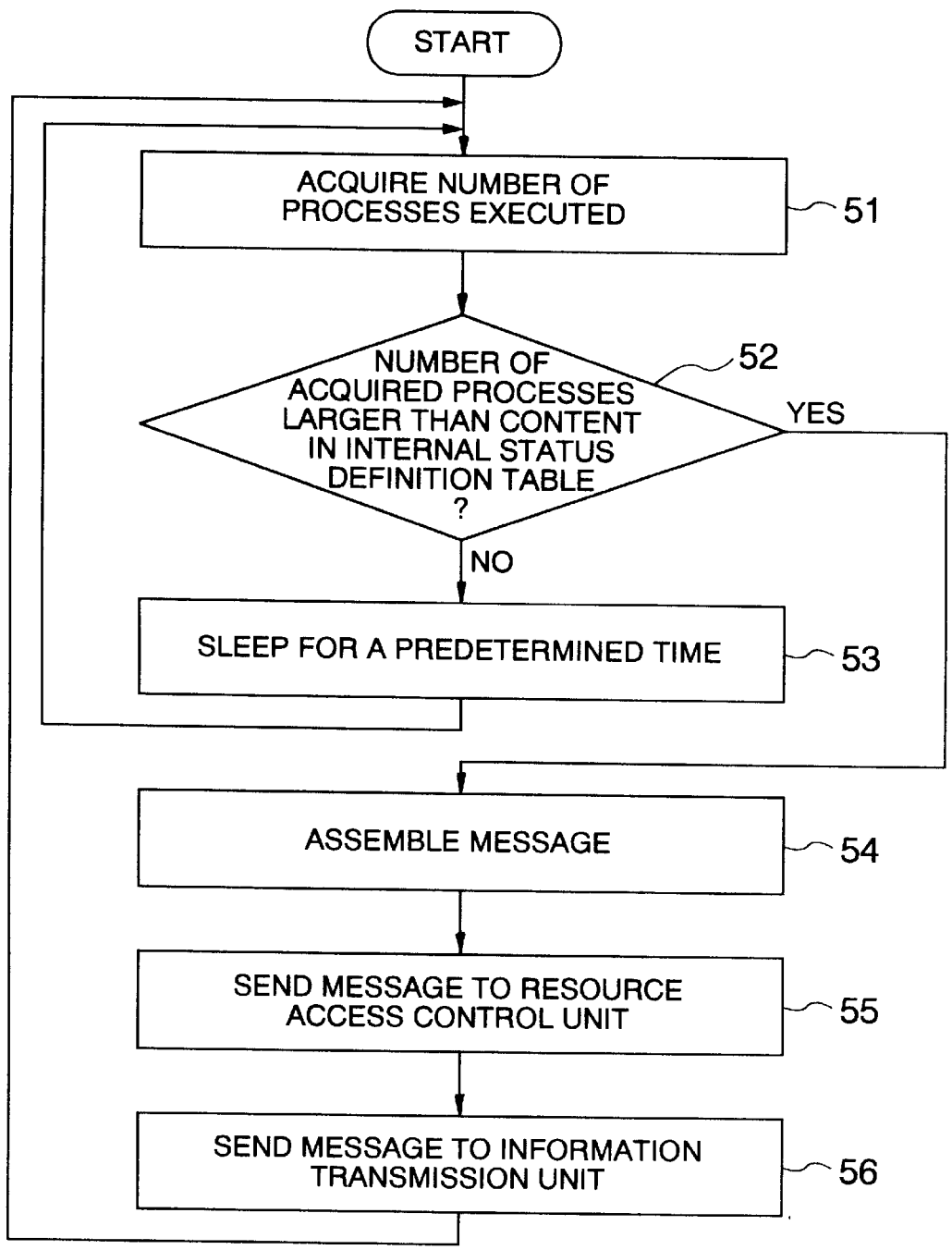
FIG. 5 is a flowchart for monitoring the process table in the computer shown in FIGS. 2A and 2B.

FIG. 5 is a flowchart showing an example of the monitor processing by the internal status monitor sensor unit 22 of the computers 11 to 15 with an eye on the number of processes in execution by the local computer. First, the number of processes in execution is acquired for each user ID from the process table 27 in the operating system 26 (step 51). Then, the number of processes for each user ID acquired in this step is compared with the limited value of the number of processes of the user ID described in the internal status definition table 21 (step 52). Unless the number of processes in execution exceeds the associated limited value for any of the user IDs, the monitor sleeps for a predetermined period of time (step 53). In the case where the number of processes in execution for any user ID exceeds the limited value, by contrast, a message is assembled to be given to the other processing sections 23, 24 of the local computer and the other computers, which message indicates "the process number definition table monitoring result" as the field 92 shown in FIG. 9, including a message indicating the user ID and the limited value of the associated process number as the record data 93 (step 54). Then, the message prepared in step 54 is sent to the resource access control unit 23 (step 55). The message prepared in step 54 is further sent to the information transmission unit 24 (step 56). After that, the process returns to step 51. The processing for receiving the message is executed in the sequence shown in FIG. 10.

Figure 6:
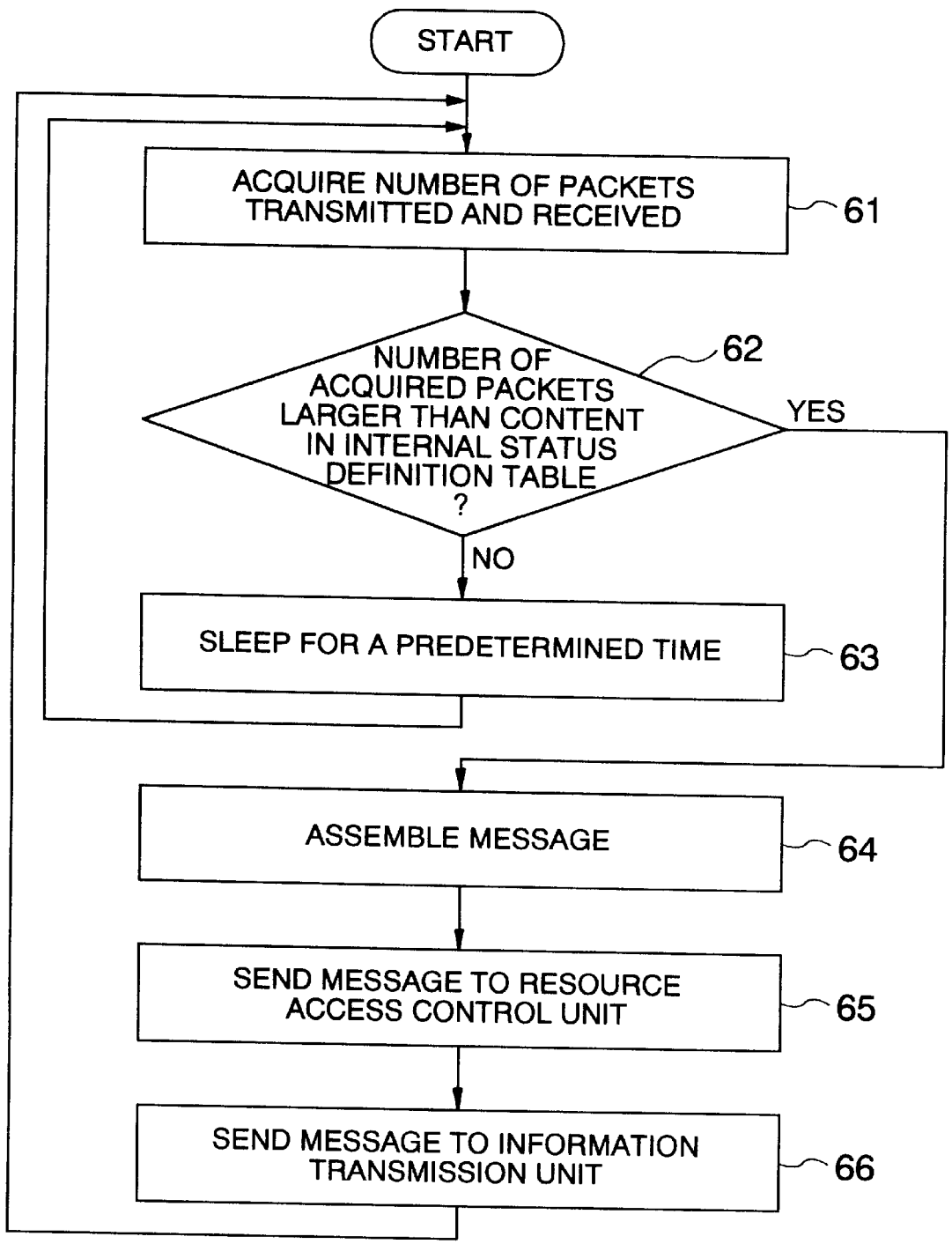
FIG. 6 is a flowchart for monitoring the traffic of a network in the computer shown in FIGS. 2A and 2B.

FIG. 6 is a flowchart showing the monitor processing executed by the internal status monitor sensor unit 22 of the computers 11 to 15 with emphasis placed on the traffic of the network interface section of the local computer. First, the number of packets received per unit of time is acquired from the traffic storage table 211 for each network or host address (step 61).

More specifically, the number of packets received per unit of time is determined for each destination address in field 2112 with reference to the communication start time in field 2112 and the number of input packets in field 2113 associated with each field 2112. In other words, the elapsed time is determined from the difference between the communication start time and the present time, and the number of input packets in field 2113 is divided by the elapsed time for determining the number of input packets received per unit of time.

The number of received packets determined at step 61 is compared with the limited value of the number of received packets at the corresponding network address described in the internal status definition table 21 for each network or host address (step 62). In the case where the number of packets received determined at step 61 is not larger than the limited value of the corresponding number of received packets for any network or host address, the process returns to step 61 after sleeping for a predetermined length of time (step 63). In the case where the number of packets determined in step 61 exceeds the limited value of the corresponding number of packets for a given host or network address, by contrast, a message is assembled to be notified to the other processing units of the local computer and the other computers, i.e., a message containing "the network interface monitoring result" as the field 92, the network or host address as the record data 93 and the limited value of the number of the corresponding received packets, as shown in FIG. 9 (step 64). The message prepared in step 64 is sent to the resource access control unit 23 (step 65). Further, the same message is transmitted to the information transmission unit 24 (step 66). After that, the process returns to step 61. The processing for receiving the message is executed in the manner shown in FIG. 10.

The limited value of the total number of output packets and input packets per unit of time may be determined for each destination of communication, so that the message is transmitted when the actual number of packets input or output per unit of time exceeds this limited value.

Figure 7:
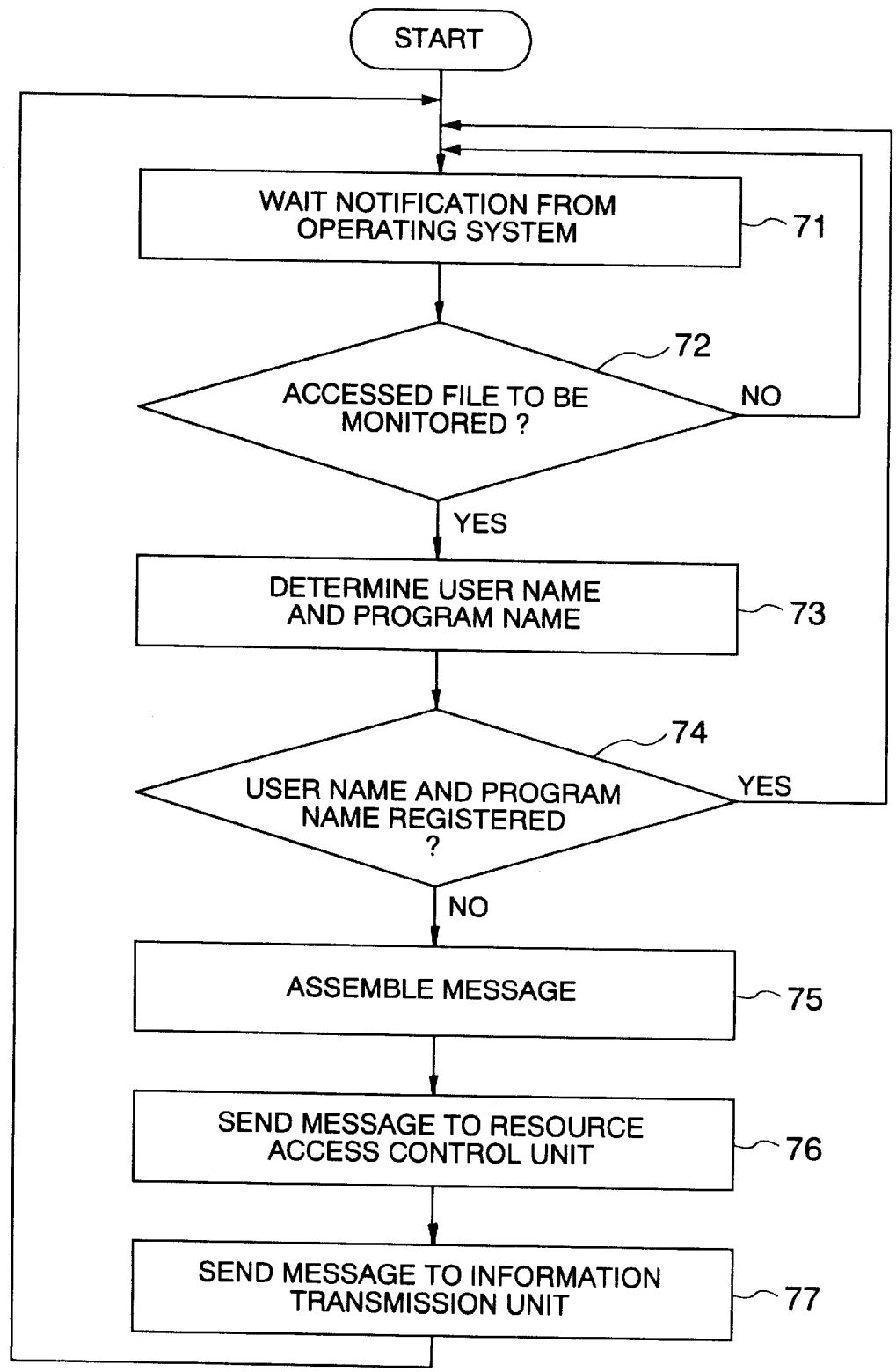
FIG. 7 is a flowchart showing the processing for monitoring the file system in the computer shown in FIGS. 2A and 2B.

FIG. 7 is a flowchart showing the monitor processing executed when a request is generated for accessing a file in the file system 210 of the local computer in the user process. First, a notification is awaited of the generation of a file access request from the operating system 26 to the sensor 22 (step 71).

In the UNIX operating system, for example, upon receipt of a file system access request, a routine is called to search for the requested data block and to return the pointer to the particular data to the application program. In this routine, the ID of the file accessed and the IDs of the user and the process executing the access are recorded in the fields of the access file information recording area 212, and a message is given to the internal status monitor-sensor unit 22 notifying that the data has been recorded. Upon receipt of the notification, the filed system control system call unit 29 scanning the access file information recording area 212 notifies the ID of the process that has requested the file access and the ID of the accessed file to the internal status monitor-sensor unit 22. With reference to the open file information table 87 of the internal status table 21, step 72 checks to see whether the accessed file is an object to be monitored, i.e., whether the accessed file is included in the file name field 88 of the table 87. Unless the accessed file is an object to be monitored, i.e., unless the accessed file is included in the file name field 88, then the process returns to step 71. In the case where the accessed file is an object to be monitored, i.e., in the case where the accessed file is included in the file name field 88, on the other hand, the name of the person who has used the accessed file and the name of the initiated program are determined from the process ID acquired at step 71 (step 73). The person who has used the accessed file and the initiated program determined at step 73 are checked to see whether they both coincide (in registration) with the names of the access user and the program of the corresponding file described in the open file information table 87 of the respective internal status definition table 21 (step 74). In the case where the name of the access user and the initiated program are both coincident with the user and the program names in the table 87, it is determined that there is no problem and the process returns to step 71. In the case where the access user and/or the initiated program is not coincident, on the other hand, a message is assembled to be notified to other processing units of the local computer and the other computers, i.e., a message including "the open file monitoring result" as the field 92, and the file name, the corresponding access user name and the program name as the record file 73, as shown in FIG. 9 (step 75). The message prepared in step 75 is transmitted to the resource access control unit 23 (step 76). Further, the same message is transmitted to the information transmission unit 24 (step 76). After that, the process returns to step 71. The processing for receiving the message is shown in the flowchart of FIG. 10.

In the security system for the network of this type, the processing for monitoring the internal status of the computers 11 to 15 is executed as a combination of the processings shown in FIGS. 5 to 7.

Figure 10:
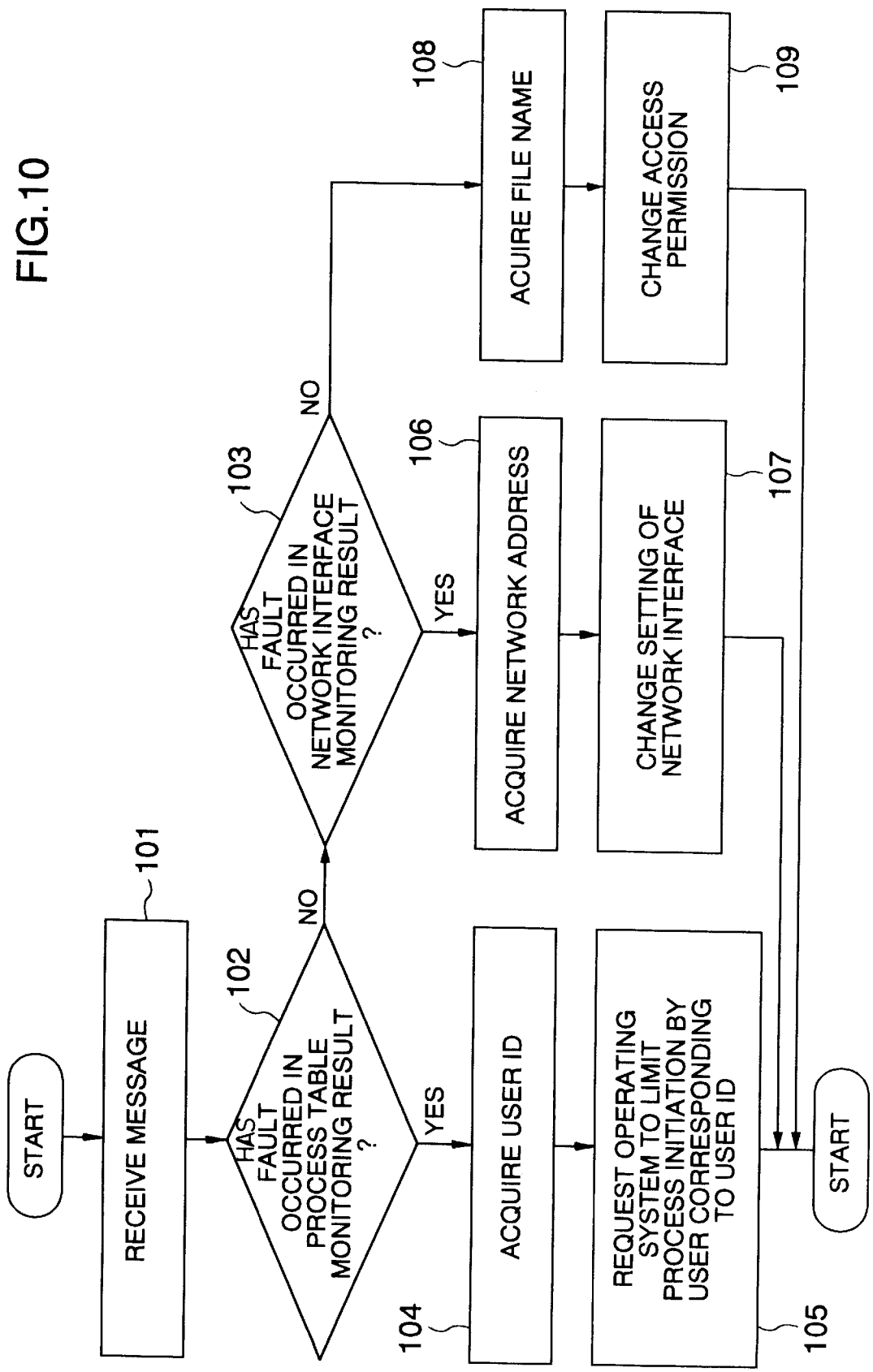
FIG. 10 is a flowchart showing the processing taken by the resource access control unit of the computer shown in FIGS. 2A and 2B.

FIG. 10 is a flowchart showing the processing executed in the resource access control unit 23 of each of the computers 11 to 15 when the notification (message) is received from the internal status monitor-sensor unit 22 of the local computer. First, the message 91 is received (step 101). Then, it is determined whether the fault type 92 of the message received coincides with "the process number definition table monitoring result" or not (step 102). Otherwise, it is determined whether the fault type 92 coincides with "the network interface monitoring result" (step 103).

In the case where step 102 determines that the fault type 92 coincides with "the process number definition table monitoring result", the ID of the user associated with the fault determination is acquired from the internal information table record storage field 93 (step 104). Then, the operating system 26 is requested to limit the initiation of the process by the user indicated by the user ID (step 105). For example, the operating system 26 has an area for storing the user ID acquired in step 104, i.e., a user ID table 213 (FIGS. 2A, 2B). A process generation system call unit 214 suppresses the generation of a new process for a user coinciding with the user stored in the user table 213 as a result of referring to the user ID table 213.

In the case where step 103 determines that the fault type 92 is "the network interface monitoring result", the address of the network or host for which the number of packets received per unit of time is determined abnormal is acquired from the internal information table record storage field 93 of the message 91 (step 106). Then, the setting of the network interface is changed in the network driver 28 in such a manner as to interrupt the access from the particular network or host (step 107). For example, the operating system 26 has the function of filtering the communication in accordance with the destination with respect to the input and output of the network interface of the network driver 28, and changes the setting of the network interface in such a manner as to suppress the input (receipt of packets) with respect to the communication from the network or host shown in the network address.

As an alternative, the communication between the network or host of the network address determined abnormal and the local computer can be suppressed in steps. For example, the limited value of the number of packets received per unit of time is classified into a first limited value and a second limited value larger than the first limited value, and when the number of packets received per unit of time reaches the first limited value, the receipt of the packets from the network or host is suppressed, while when the second limited value is reached, the transmission and receipt between the network or host and the local computer is suppressed.

In the case where step 103 determines that the fault type 92 is not "the network interface monitoring result", i.e., in the case where a given file is accessed by an unexpected user and/or in the case where a given file is accessed with an unexpected program, then the file name is acquired from the internal information table record storage field 93 of the message 91 (step 108). The operating system then is requested to alter the access permission for the particular file (step 109). The operating system has the function of controlling the access to the management resources. In the case of the UNIX system, for example, the permission for "read", "write" and "execute" can be set for each file in accordance with three categories including the user constituting the owner of the file, a user belonging to a group of which the owner is a member and other users. In the case under consideration, the file access permission is altered in such a manner as to enable only the owner to read the file which the other group members and other users have thus far been permitted to "read" or in such a manner as to cancel all the permissions to "write". It is also possible to execute the access control stepwise in accordance with the degree of a fault (intrusion) detected by the monitor processing.

More specifically, in the case where a plurality of files registered in the table 87 are accessed illegitimately by an unexpected user, the access may be controlled stepwise in accordance with the number of files illegitimately accessed. In the case where the number of files illegitimately accessed is less than a predetermined value, for example, only the write operation to the file of the user is limited, while in the case where the number of files accessed illegitimately is not less than a predetermined value, on the other hand, the write and read operation of the file of the user is limited. For other operating systems than UNIX, the write operation to (and/or the read operation from) only a part of the file of the user may be limited in the case where the number of files accessed illegitimately is less than a predetermined value, while the write operation to (and/or the read operation from) the whole (all the range) of the file of the user may be limited in the case where the number of illegitimately accessed files is not less than a predetermined value.

The access control processing (step 44 in FIG. 4) is executed in similar fashion to steps 101 to 109 shown in FIG. 10 in the case where a given computer has received a message notifying a fault from other computers. The reason is that a given user who is executing more than an unexpected number of processes in other computers is liable to execute more than an expected number of processes also in the local computer. Similarly, in the case where other computers have received an unexpected number of packets per unit of time from a given network or a given computer (host), the local computer is likely to receive an unexpected number of packets per unit of time from the same network or the same computer (host). Further, in the case where a given file of other computers is accessed by an unexpected user or in the case where the other computers are accessed with an unexpected program, the corresponding file of the local computer is liable to be accessed by an unexpected user or with an unexpected program.

In the above-mentioned embodiments, the computers 11 to 15 are all configured to have the internal status monitor-sensor unit 22, the resource access control unit 23 and the information transmission unit 24. In other embodiments of the invention, however, at least one of the computers 11 to 15 are configured to have these processing units 22 to 24, while the other computers may have the resource access control unit 23 and the information transmission unit 24 and lack the internal information monitor-sensor unit 22 with equal effect.

Also, although the internal network (intracompany LAN) is connected to a single external network in the above-mentioned embodiments, the present invention is also applicable to the case in which the internal network is connected to a plurality of external networks.

Further, in the embodiments described above, a subnetwork may be configured with some of a plurality of computers connected to the internal network, so that a given one computer connected to the internal network other than the subnetwork may determine that the traffic volume from the subnetwork is abnormal and thus may limit the access from the subnetwork to the particular computer in the case where the number of packets received per unit of time from the subnetwork is more than a predetermined value.

Preferred embodiments of the invention were described above, and various other modifications and alterations are possible. A computer connected to a network, for example, can be so configured as to notify the contents of a table registering the resources to be monitored to other computers when updating the table, so that the other computers can update the contents of the corresponding table registering the resources to be monitored.

Also, the computers connected to a network system in which a plurality of servers cooperate in providing the services such as the network news casting or the mail system can take a joint measure against an intrusion or alter operation of such services in accordance with the protective measure taken against the intrusion. Specifically, a network news system is one in which a news article sent from the user to the nearest news server is exchanged periodically with adjacent news servers thereby to enable all the news servers to hold the same news articles. In this system, (1) a fault which may be detected by a given server can be notified to adjacent servers by taking advantage of the news system, and (2) the server that has detected a fault can be isolated from the whole system so that the remaining news servers may continue to provide the service.

It will thus be understood from the foregoing description that according to the present invention, in a network having a plurality of computers connected thereto, illegitimate access of an external intruder through the network to a local computer is controlled and the intrusion is notified to adjacent computers, thereby protecting the computer resources in the intracompany network. Especially, the notification of the intrusion to a firewall makes possible the overall protection of the computer resources of the whole organization.

We claim:

1. A security system for a network including a plurality of computers, at least one computer from said plurality of computers on said network comprising:
   an internal status monitor unit for monitoring an internal status of said one computer to detect an occurrence of a fault and a type of said fault occurred in said one computer;
   an access control unit for controlling access to resources of said one computer to protect the resources from intrusion in accordance with the type of said fault occurred in said one computer;
   a memory containing destination information of other computers on said network in accordance with the type of said fault occurred in said one computer; and
   an information transmission unit for obtaining the destination information from said memory in accordance with the type of said fault occurred in said one computer, and for transmitting, through said network, a message indicating the occurrence of a fault and the type of said fault occurred in said one computer to at least one other computer from said plurality of computers on said network in accordance with the destination information obtained from said memory.

2. A security system according to claim 1, wherein:
   said internal status monitor unit determines that a number of processes being executed in said one computer by a user is abnormal when the number of processes being executed in said one computer is not less than a predetermined value, and
   said access control unit limits initiation of a process in said one computer by said user when said internal status monitor unit determines that the number of processes being executed by said one computer is abnormal.

3. A security system according to claim 2, wherein said access control unit limits the initiation of processes in said one computer by said user in a stepwise manner in accordance with the number of processes being executed in said one computer when said internal status monitor unit determines that the number of processes being executed by said one computer is abnormal.

4. A security system according to claim 2, wherein said internal status monitor unit includes a table containing a limited value of the number of processes in execution permitted by said one computer for each of a plurality of predetermined users, said internal status monitor unit determining that the number of processes being executed in said one computer by said user is abnormal when the number of processes being executed by said user is not less than a corresponding limited value contained in said table.

5. A security system according to claim 2, wherein said information transmission unit transmits a message indicating that the number of processes being executed in said one computer is abnormal and identifying said user when said internal status monitor unit determines that the number of processes being executed in said one computer is abnormal.

6. A security system according to claim 1, wherein:
   said internal status monitor unit determines that a volume of traffic in said one computer from said other computer is abnormal when a number of data packets received per unit of time from said other computer over said network is not less than a predetermined value, and
   said access control unit limits access to said one computer by said other computer on said network when said internal status monitor unit determines that the volume of traffic from said other computer is abnormal.

7. A security system according to claim 6, wherein said access control unit limits access to said one computer by said other computer in a stepwise manner in accordance with the number of data packets received per unit of time from said other computer over said network when said internal status monitor unit determines that the volume of traffic from said other computer is abnormal.

8. A security system according to claim 6, wherein said internal status monitor unit includes a table containing a limited value of the number of data packets which said other computer on said network is permitted to receive per unit of time, said internal status monitor unit determining that the number of data packets received from said other computer over said network is abnormal when the number of data packets per unit of time from said other computer is not less than said limited value contained in said table.

9. A security system according to claim 6, wherein said information transmission unit transmits a message indicating that the volume of traffic from said other computer is abnormal and identifying said other computer when said internal status monitor unit determines that the volume of traffic from said other computer is abnormal.

10. A security system according to claim 1, wherein:
    said internal status monitor unit determines that one of a plurality of predetermined files is accessed abnormally when said one file is accessed by a user other than a predetermined user or when said one file is accessed using a program other than a predetermined program, and said access control unit limits access to said one file of said one computer when said internal status monitor unit determines that said file of said one computer is accessed abnormally.

11. A security system according to claim 10, wherein said access control unit limits access to the files of said one computer by said user in a stepwise manner in accordance with the number of files in said one computer being accessed abnormally when said internal status monitor unit determines that said files of said one computer are accessed abnormally.

12. A security system according to claim 10, wherein said internal status monitor unit includes a table for determining a user accessible to each of a plurality of predetermined files and a program usable for accessing said file, said internal status monitor unit determining that a file of said one computer is accessed abnormally when one of said predetermined files is accessed by a user other than a corresponding user registered in said table or when said one file is accessed using a program other than a corresponding program registered in said table.

13. A security system according to claim 10, wherein said information transmission unit transmits a message indicating that a file of said one computer is accessed abnormally when said internal status monitor unit determines that said file of said one computer is accessed illegitimately or abnormally.

14. A security system according to claim 1, wherein:
said information transmission unit further receives a message transmitted from said other computer over said network indicating occurrence of a fault and the type of said fault occurred in said other computer, and
said access control unit executes access control processing for protecting the resources of said one computer in accordance with the type of said fault occurred in said other computer indicated in said message received from said other computer over said network.

15. A security system according to claim 1, wherein said other computer on said network receives the message transmitted from said one computer over said network, and includes an access control unit for controlling access to protect resources from intrusion in accordance with the type of said fault occurred in said one computer indicated by the message received over said network.

16. A security system according to claim 1, further comprising:
a firewall for connecting said plurality of computers to an external network; and
said memory in said one computer further including information representing said firewall as a destination in accordance with a predetermined type of said fault occurred in said one computer;
said information transmission unit in said one computer further obtaining, when said internal status monitor unit determines the type of said fault occurred in said one computer, the information representing said firewall as the destination from said memory in accordance with the type of said fault occurred and transmitting through said network a message indicating the occurrence of a fault and the type of said fault occurred in said one computer to said firewall, wherein said firewall performs access control processing for said plurality of computers in response to the message received from said one computer over said network.

17. A security system according to claim 14, wherein said message received from said other computer over said network is determined for legitimacy with reference to the destination information contained in said memory, by decrypting an electronic signature indicating a source written in said message.

18. A security system for a network including a plurality of computers connected thereto, each computer comprising:
an internal status monitor unit for monitoring an internal status of said computer to detect an occurrence of a fault and a type of said fault occurred in said computer;
an access control unit for controlling access to resources of said computer;
a memory containing destination information of other computers on said network in accordance with the type of said fault occurred in said computer; and
an information transmission unit for obtaining the destination information from said memory in accordance with the type of said fault occurred in said computer, and for transmitting, through said network, to at least one other computer on said network a message indicating the occurrence of said fault in said computer and the type of said fault occurred in said computer in accordance with the destination information obtained from said memory, said information transmission unit further receiving from said other computer over said network a message indicating the occurrence of a fault and the type of said fault occurred in said other computer, and wherein said access control unit executes processing for protecting the resources of said computer in accordance with either the type of said fault occurred in said computer or the type of said fault indicated by a message received from said other computer over said network.

19. A security system according to claim 18, wherein said message received from said other computer over said network is determined for legitimacy with reference to the destination information contained in said memory, by decrypting an electronic signature indicating a source written in said message.

20. A security system for a network including a plurality of computers connected to an internal network, and at least one computer connected to an external network, said one computer comprising:
an internal status monitor unit for monitoring an internal status of said one computer to detect an occurrence of a fault and a type of said fault occurred in said one computer;
an access control unit for controlling access to resources of said one computer to protect the resources from intrusion in accordance with the type of said fault occurred in said one computer;
a memory containing destination information of other computers on said internal network in accordance with the type of said fault occurred in said one computer; and
an information transmission unit for obtaining the destination information from said memory in accordance with the type of said fault occurred in said one computer, and for transmitting a message to at least one other computer on said internal network indicating the occurrence of said fault and the type of said fault occurred in said one computer in accordance with the destination information obtained from said memory, and
said other computer including an information transmission unit for receiving the message transmitted from said one computer on said internal network.

21. A security system according to claim 20, wherein said internal status monitor unit includes:

means for determining that a number of processes being executed in said one computer is abnormal when a user from a plurality of predetermined users is executing not less than a predetermined number of processes in said one computer;

means for determining that a volume of traffic from said external network of said one computer when a number of data packets received per unit of time from said external network is not less than a predetermined value, and determining the volume of traffic from said other computer on said internal network is abnormal when the number of data packets received per unit of time from said other computer is not less than said predetermined value; and means for determining that one of a plurality of predetermined files of said one computer is accessed abnormally when said one file is accessed by a user other than said predetermined users or when said one file is accessed using a program other than a predetermined program; and wherein said access control unit includes:

means for limiting initiation of a process in said one computer by said one user when said internal status monitor unit determines that the number of processes being executed in said one computer is abnormal;

means for limiting access to said one computer by said external network or by said other computer on said internal network when said internal status monitor unit determines that the volume of traffic from said external network or said other computer on said internal network is abnormal; and means for limiting access to said one file when said internal status monitor unit determines that said one file of said one computer is accessed abnormally.

22. A security system according to claim 18, wherein said information transmission unit includes:

means for transmitting a message indicating that a number of processes being executed by said one computer is abnormal and identifying a user when said internal status monitor unit determines that the number of processes being executed in said one computer is abnormal;

means for transmitting a message indicating that a volume of traffic from said external network or from said other computer on said internal network is abnormal and identifying said other computer when said internal status monitor unit determines that the volume of traffic from said external network or from said other computer on said internal network is abnormal; and means for transmitting a message indicating that one file of said one computer is accessed abnormally and identifying said one file when said internal status monitor unit determines that said one file of said one computer is accessed abnormally.

23. A security system according to claim 20, wherein said message received from said other computer over said network is determined for legitimacy with reference to the destination information contained in said memory, by decrypting an electronic signature indicating a source written in said message.

24. A network security method for a network implemented by one computer from a plurality of computers connected to said network, comprising the steps of:

a) monitoring an internal status of said one computer to detect an occurrence of a fault and a type of said fault occurred in said one computer;

b) executing access control processing to protect resources of said one computer in accordance with the type of said fault occurred in said one computer; and c) obtaining destination information from a memory in accordance with the type of said fault occurred in said one computer, and transmitting through said network a message to at least one other computer from said plurality of said computers on said network indicating the occurrence of a fault and the type of said fault occurred in said one computer in accordance with the destination information obtained from said memory.

25. A network security method according to claim 24, further comprising the step of:

d) controlling access to resources of said other computer on said network and protecting said resources in accordance with the type of said fault occurred in said one computer indicated by said message transmitted from said one computer over said network.

26. A network security method according to claim 24, wherein a firewall is connected between said plurality of computers and an external network, and said memory in said one computer further includes information representing said firewall as a destination corresponding to a predetermined type of a fault in said one computer, further comprising the steps of:

e) in said one computer, when the occurrence of said fault of said predetermined type is detected in said one computer in said step (a), obtaining the information representing said firewall as the destination from said memory in accordance with the fault detected and transmitting through said network a message indicating the occurrence of a fault and the type of said fault occurred in said one computer to said firewall over said network; and f) in said firewall, performing access control processing for said plurality of computers in response to the message transmitted in said step (e).

27. A network security method according to claim 24, further comprising the steps of:

receiving a message transmitted from said other computer on said network indicating an occurrence of a fault and a type of said fault occurred in said other computer; and executing access control processing for protecting the resources of said one computer in accordance with the type of said fault occurred in said other computer indicated by said message received from said other computer over said network.

28. A network security method according to claim 27, wherein said message received from said other computer over said network is determined for legitimacy with reference to the destination information contained in said memory, by decrypting an electronic signature indicating a source written in said message.

29. A network security method implemented by one computer connected to at least one external network from a plurality of computers connected to an internal network, comprising the steps of:

a) monitoring an internal status of said one computer and detecting an occurrence of a fault and a type of said fault occurred in said one computer;

b) executing access control processing for protecting resources of said one computer in accordance with the type of said fault occurred in said one computer; and c) obtaining destination information from a memory in accordance with the type of said fault occurred in said one computer, and transmitting through said internal network a message indicating the occurrence of a fault and the type of said fault occurred in said one computer to at least one other computer from said plurality of said computers on said internal network in accordance with the destination information obtained from said memory.

30. A network security method according to claim 29, further comprising the steps of:

d) receiving said message transmitted from said other computer through said internal network indicating the occurrence of a fault and the type of said fault occurred in said other computer; and e) executing access control processing for protecting the resources of said one computer in accordance with the type of said fault occurred in said other computer indicated by said message received from said other computer over said internal network.

31. A network security method according to claim 29, wherein said message received from said other computer over said network is determined for legitimacy with reference to the destination information contained in said memory, by decrypting an electronic signature indicating a source written in said message.

* * * * *